(12) United States Patent
McGregor (10) Patent No.: US 9,591,833 B1
(45) Date of Patent: Mar. 14, 2017

(54) STORAGE SYSTEM FOR CHICKEN FEEDERS

(71) Applicant: Southwest Agri-Plastics, Inc., Addison, TX (US)

(72) Inventor: Michael A. McGregor, Lewisville, TX (US)

(73) Assignee: Southwest Agri-Plastics, Inc., Addison, TX (US)

( * ) Notice: Subject to any disclaimer, the term of this patent is extended or adjusted under 35 U.S.C. 154(b) by 158 days.

(21) Appl. No.: 14/512,164

(22) Filed: Oct. 10, 2014

(51) Int. Cl.
*A01K 1/10* (2006.01)
*A01K 39/01* (2006.01)
*F16M 13/02* (2006.01)

(52) U.S. Cl.
CPC ............ *A01K 39/01* (2013.01); *F16M 13/022* (2013.01)

(58) Field of Classification Search
CPC .......................... A01K 39/01; A01K 39/0125
See application file for complete search history.

(56) References Cited

U.S. PATENT DOCUMENTS

| 3,827,405 | A | * | 8/1974 | Allen | A01K 39/0125 119/53 |
| 6,779,488 | B2 | * | 8/2004 | Corti | A01K 39/0125 119/52.4 |
| 2003/0056730 | A1 | * | 3/2003 | Corti | A01K 39/0125 119/53 |
| 2004/0025796 | A1 | * | 2/2004 | Cole | A01K 39/0125 119/55 |
| 2005/0072365 | A1 | * | 4/2005 | Busses | A01K 39/0125 119/57.7 |
| 2007/0051318 | A1 | * | 3/2007 | Cole | A01K 1/10 119/57.1 |
| 2009/0114160 | A1 | * | 5/2009 | Hung | A01K 39/01 119/61.3 |
| 2016/0073615 | A1 | * | 3/2016 | Van Kerrebroeck | A01K 39/0125 134/22.12 |
| 2016/0095300 | A1 | * | 4/2016 | Steudler, Jr. | A01K 5/0208 119/51.01 |

* cited by examiner

Primary Examiner — Kristen C Hayes
(74) Attorney, Agent, or Firm — Gardere Wynne Sewell LLP (57) ABSTRACT

A storage apparatus for a chicken feeder includes a body section, a coupling member and a feeder contacting section. The coupling member is positioned on a first end of the body section for securing the body section to a chicken feed tube. The feeder contacting section is positioned on a second end of the body section and includes angled arms to support a feeder above the feed tube.

17 Claims, 12 Drawing Sheets

STORAGE SYSTEM FOR CHICKEN FEEDERS

TECHNICAL FIELD

This disclosure relates to feeders for chickens, and in particular, to an apparatus, system and method for storing chicken feeders in an efficient manner between uses.

BACKGROUND OF THE DISCLOSURE

A chicken producer often uses multiple sizes and/or types of chicken feeders to feed a group of chickens as the group grows and matures. For example, a chicken producer may use small chicken feeders having low profile feed dishes during the first several weeks of a chicken's life and larger feeders for the remainder of the chicken's life. The low profile dish of the smaller feeders allows recently-hatched chicks to access food in the feed dish. The larger feeders allow the chickens to eat as they grow and mature. As the chickens grow, the smaller, low-profile feeders become unsuitable for feeding and must be removed to avoid contamination of food in the smaller feeders by the matured chickens stepping into the feed trays and to provide adequate space for the mature chicken to eat from the larger feeders. As such, the chicken producer removes the smaller feeders and stores the feeders at a location outside of the feeding area. Oftentimes, the chicken producer must disassemble each feeder in order to store the feeders in an organized manner.

When the chickens reach the desired size and/or age, the chicken producer removes the chickens from the feeding area and prepares the feeding area for a new group of recently-hatched chicks. Before moving the recently-hatched chicks into the feeding area, the feed producer must retrieve the smaller feeders from their storage location, reassemble the feeders, and then place the assembled feeders at the desired locations in the feeding area. Due to the relatively short timeframe from the birth of a group of chicks to harvesting of the matured chickens (typically between about six to nine weeks), as well as the large number of chicken feeders required to feed a group of chickens, the process of removing, disassembling, storing and reinstalling the feeders is very time consuming and labor intensive. It would be beneficial to have a storage means for chicken feeders that is convenient to use and reduces the time and labor involved in removing, storing and reinstalling the chicken feeders between uses.

SUMMARY

In a first aspect, there is provided a storage apparatus for storing a chicken feeder on a feed tube. The storage apparatus includes a body section and a coupling member on a first end of the body section for securing the body section to the chicken feed tube. The apparatus also includes a feeder contacting section on a second end of the body section. The feeder contacting section includes at least one arm to support a feeder above the feed tube.

In some embodiments, the body section is removably attachable to the coupling member.

In other embodiments, the body section is slideably attachable to the coupling member.

In yet other embodiments, the body section includes a pair of support beams and one or more transverse beams extending between the support beams.

In still another embodiment, the body section extends upwardly from the feed tube when the coupling mechanism is coupled to the feed tube.

In another embodiment, the at least one arm includes a pair of arms and the arms are angled towards each other. In addition, the feeder contacting portion includes a convex arm extending between the pair of arms.

In still another embodiment, the pair of arms are angled away from each other and the arms each include one or more fingers at a distal end of the arms.

In some embodiments, the coupling member couples to the feed tube by a friction fit.

In a second aspect, there is provided a feeder system that includes a feeder and a storage apparatus. The storage apparatus includes a body section and a coupling member on a first end of the body section for securing the body section to a feed line. The apparatus also includes a feeder contacting section extending from a second end of the body section. The feeder contacting section supports the feeder so that at least a portion of the feeder is supported above the feed line.

In some embodiments, the feeder contacting section includes arms for supporting the feeder.

In still other embodiments, a concave arm extends between the arms to support the feeder.

In another embodiment, the arms include a first finger, a second finger and a recess located between the first and second fingers for receiving an edge of the hopper.

In yet another embodiment, the coupling member is cylindrical and includes a transverse opening.

In still another embodiment, the body section is removably coupled to the coupling member.

In a third aspect, there is provided a method for storing a chicken feeder. The method includes attaching a coupling member of a storage apparatus to a feed tube so that a body section and a feeder contacting section of the storage apparatus extend upwardly from the feed tube. The method also includes placing the feeder in an inverted position on the feeder contacting section of the storage apparatus so that at least part of the feeder is supported above the feed tube.

In some embodiments, the step of placing the feeder on the feeder contacting section of the storage apparatus includes locating a rib of the feeder in a concave arm of the feeder contacting section.

In some other embodiments, the step of placing the feeder on the feeder contacting section of the storage apparatus includes supporting an edge of a hopper on first and second fingers of the feeder contacting section.

In another embodiment, the method includes placing a protrusion of the hopper within an indentation of the first finger.

In yet another embodiment, the step of attaching the coupling member to the feed tube includes expanding a transverse opening of the coupling member around the feed tube.

In some embodiments, the method includes coupling the body section to the coupling member by slideably engaging the body section with the coupling member.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
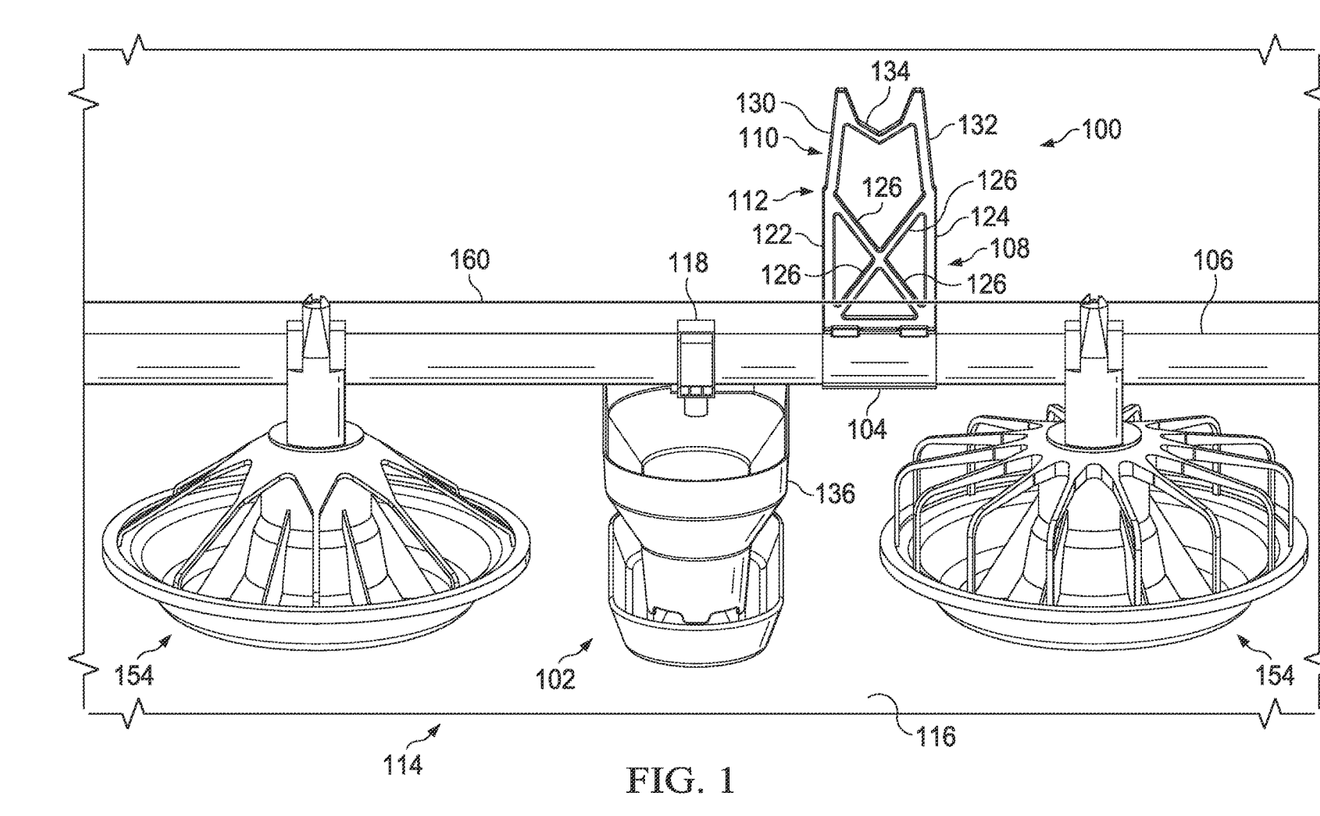
FIG. 1 is a perspective view of a chicken feeder storage apparatus coupled to a feed line in accordance with this disclosure.
Figure 2:
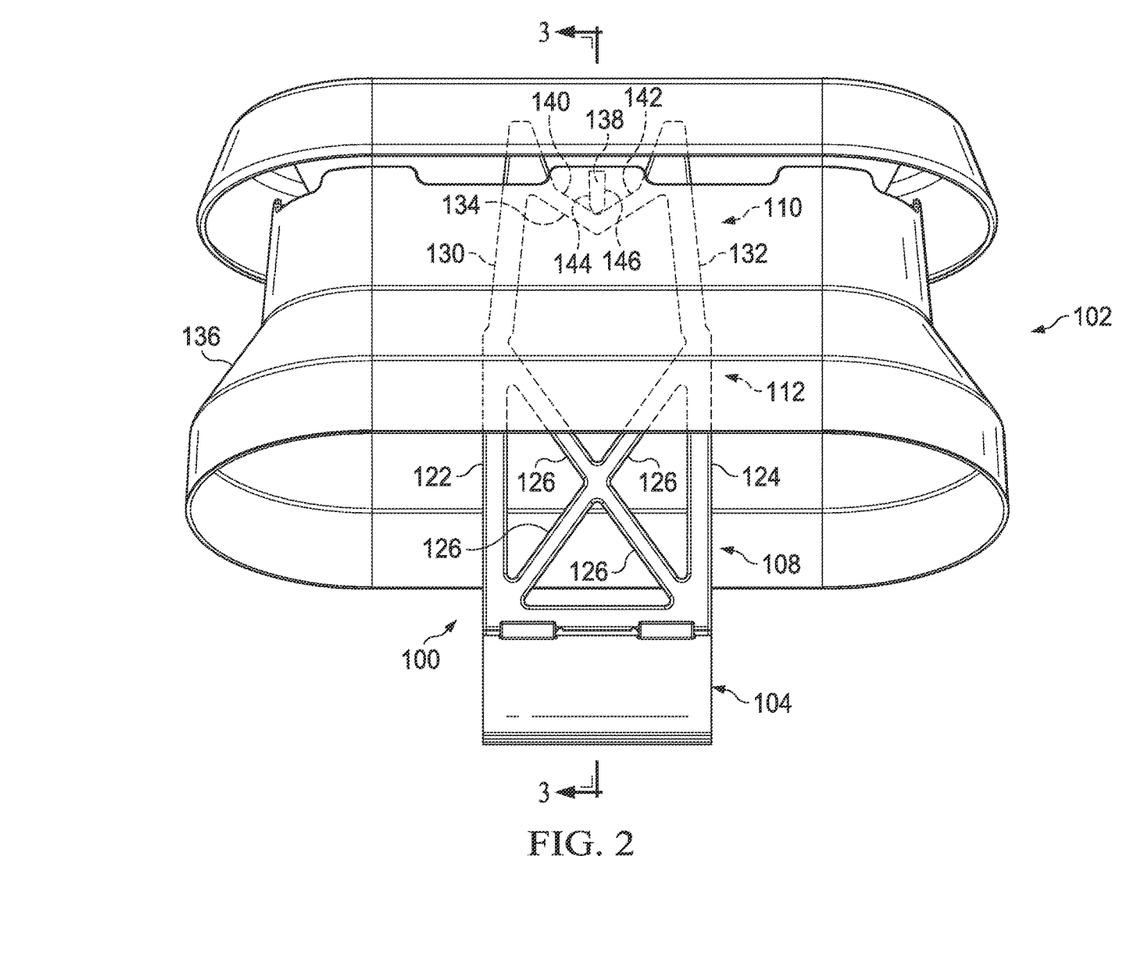
FIG. 2 is a perspective view of a chicken feeder storage apparatus with a chicken feeder resting thereon in accordance with this disclosure.
Figure 3:
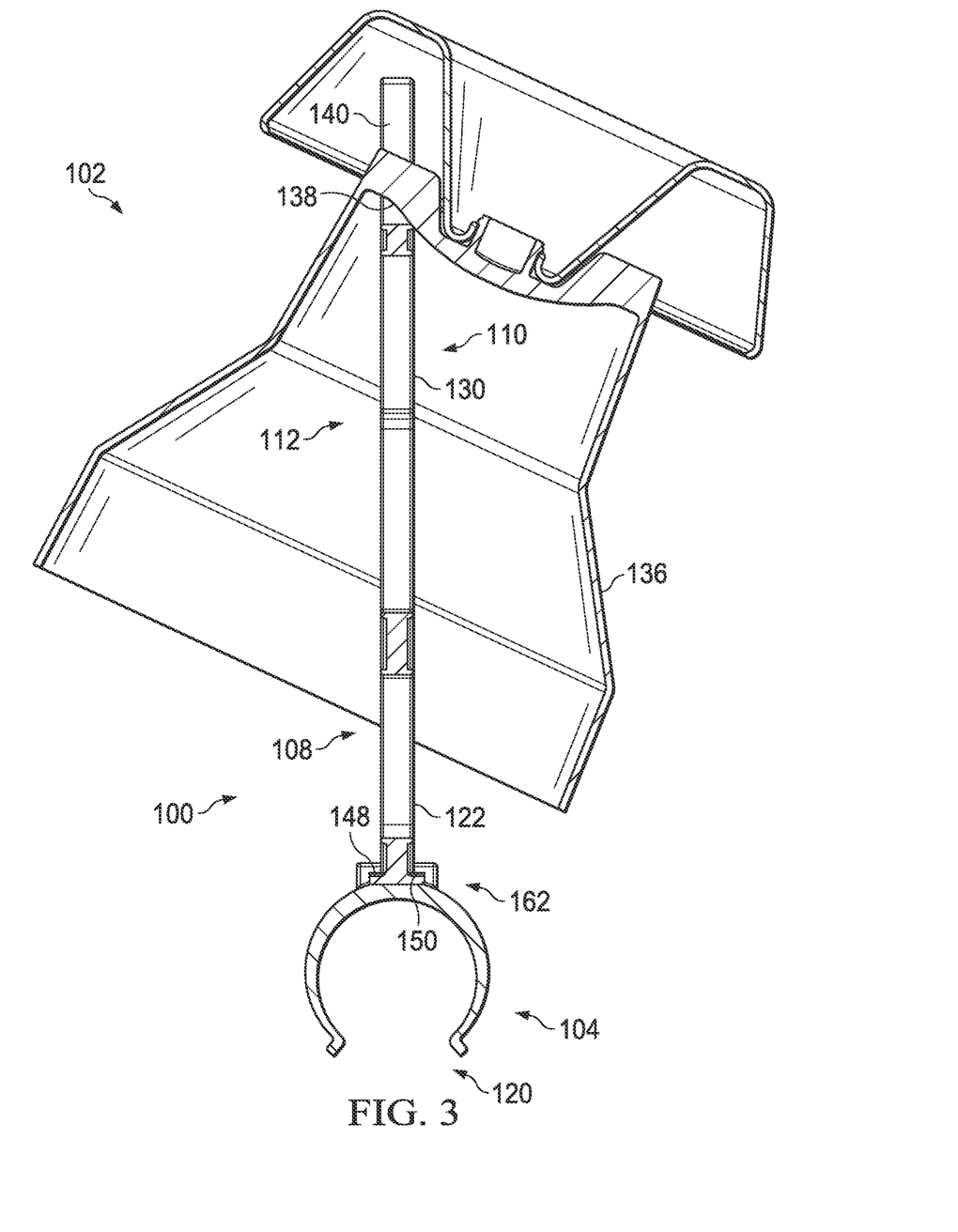
FIG. 3 is a side section view of a chicken feeder storage apparatus with a chicken feeder resting thereon in accordance with this disclosure.
Figure 4:
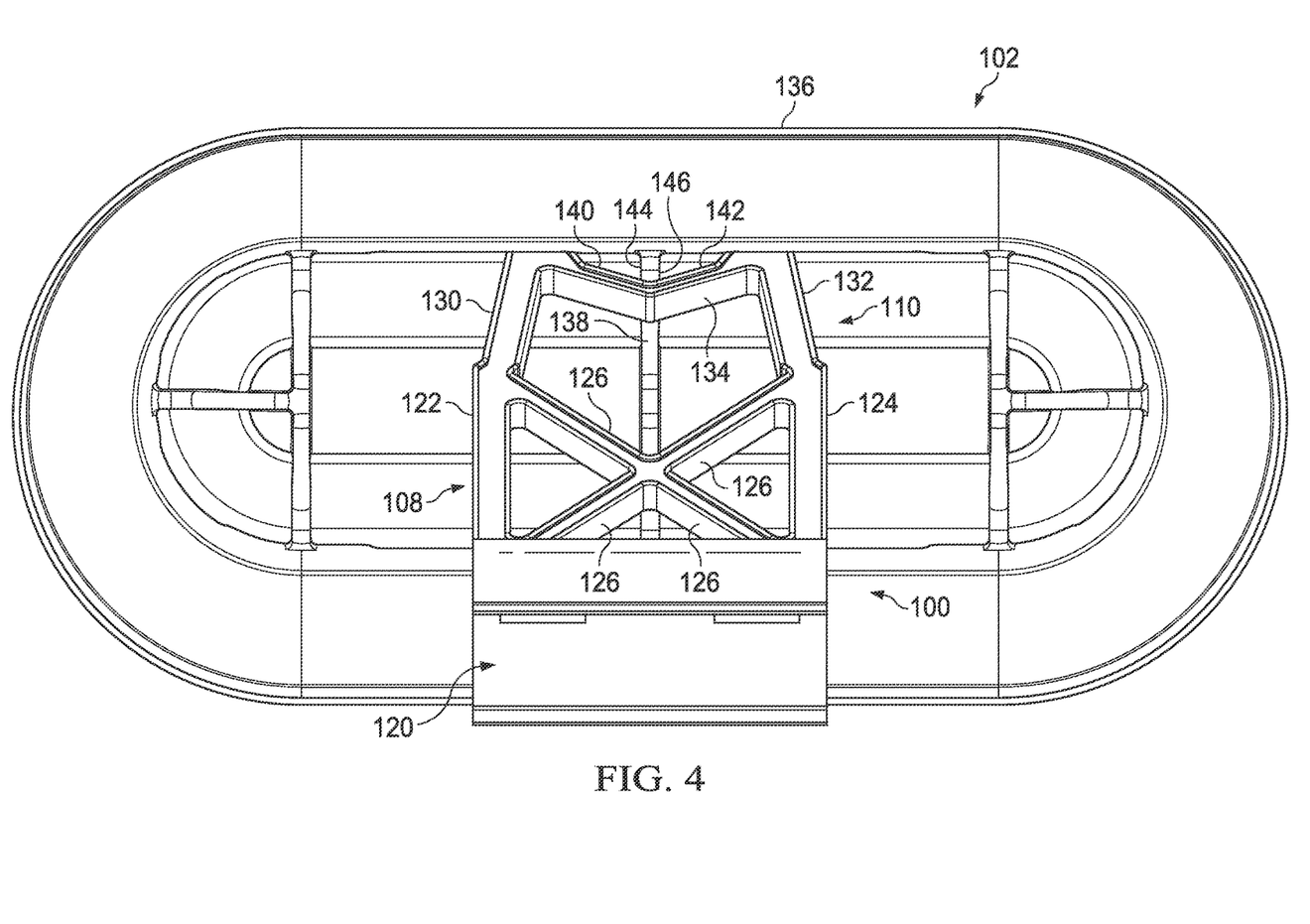
FIG. 4 is a bottom perspective view of a chicken feeder storage apparatus with a chicken feeder resting thereon in accordance with this disclosure.

FIGS. 1-6 illustrate an embodiment of a feeder storage apparatus 100 for convenient storage of a chicken feeder 102 when the chicken feeder 102 is not in use. The apparatus 100 includes a coupling member 104 for securing the apparatus 100 to a feed tube 106, a body section 108, and a feeder contacting section 110 on a first end 112 of the body section 108 to support a feeder 102 above the feed tube 106. As illustrated in FIG. 1, the feeder storage apparatus 100 is coupleable to the feed tube 106 at a position that is close to the location of the feeder 102 when the feeder 102 is in use (i.e., when the feeder 102 is positioned on a floor 116 of the feeding area 114). During normal operation, the feeder 102 rests on the floor 116 of the feeding area 114 beneath the feed tube 106. In some instances, the feeding area 114 also includes larger feeders 154 that are permanently attached to the feed tube 106 and are configured to feed the chickens once they have grown and matured. The feeders 102 and 154 are located below the feed tube 106 to receive food from the feed tube 106. The smaller, removable feeders 102 are positioned below feed outlets 118 in the feed tube 106 so food that exits the feed outlet 118 drops into the feeders 102. When the chickens have reached a desired maturity, the small chicken feeders 102 are no longer required and thus, can be removed in order to avoid contamination of food in the small feeders 102 (for example, contamination caused by the matured chickens stepping into the small feeders 102) and to provide adequate space for the mature chicken to eat from the larger feeders 154. As such, the chicken producer removes the small-chicken feeders 102 from the floor 116 and places the feeders 102 in an inverted orientation on the feeder contacting portion 110 of the feeder storage apparatus 100, as shown in FIGS. 2-4. The feeder 102 is thus stored on the feeder storage apparatus 100 in a location proximate to the feeder's position on the feeding area 114 when the feeder 102 is in use. As such, the time and effort required to store the feeder 102 is greatly reduced. In addition, the chicken producer stores the feeder 102 in a fully-assembled configuration on the apparatus 100 so that the producer need not disassemble and then reassemble the feeder 102 between uses. The feeders 102 are stored in an organized manner that does not obstruct the use of the other feeders 154 in the feeding area 114 and does not require a separate storage area for the feeders 102. As will be described in more detail below, when the producer desires to replace the feeders 102 to their location on the feeding area 114, the producer simply lifts the feeders 102 off of the storage apparatus 100 and places the feeders 102 below the feed outlets 118. As such, the time and effort to reinstall the feeders 102 is also greatly reduced.

Referring specifically to FIG. 1, the apparatus 100 is fixed to the feed tube 106 by securing the coupling member 104 to the feed tube 106 such that the body section 108 and the feeder contacting portion 110 are positioned above the feed tube 106 in a substantially vertical orientation. In some embodiments, the coupling member 104 surrounds at least part of the feed tube 106 to couple the apparatus 100 to the feed tube 106 by a friction fit. In other embodiments, the coupling member 104 includes one or more fasteners (not shown), or any other suitable fastening mechanism, to secure the apparatus 100 to the feed tube 106.

Figure 5A:
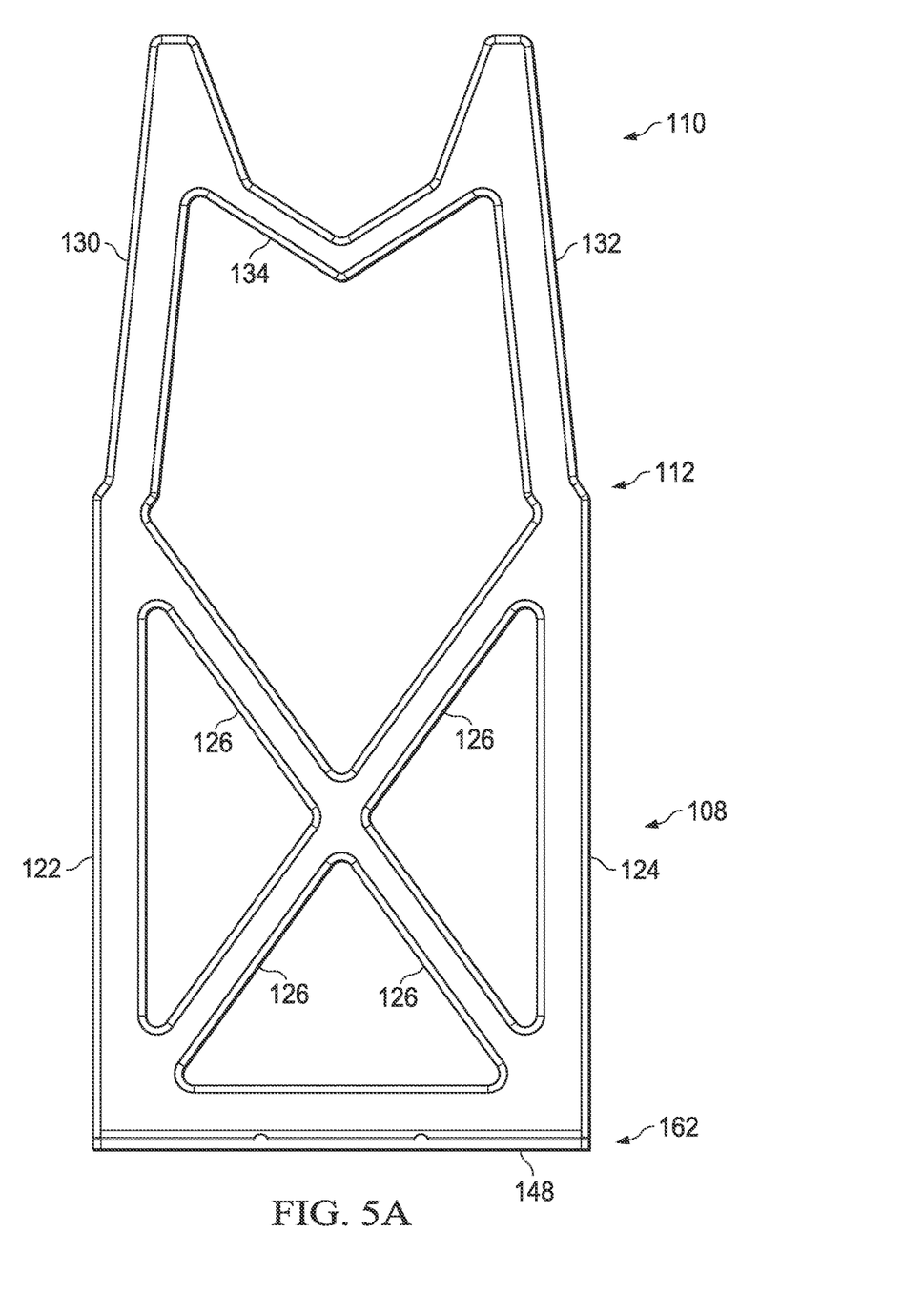
FIG. 5A is a front view of a body section and a feeder contacting section of a feeder storage apparatus in accordance with this disclosure.
Figure 5B:
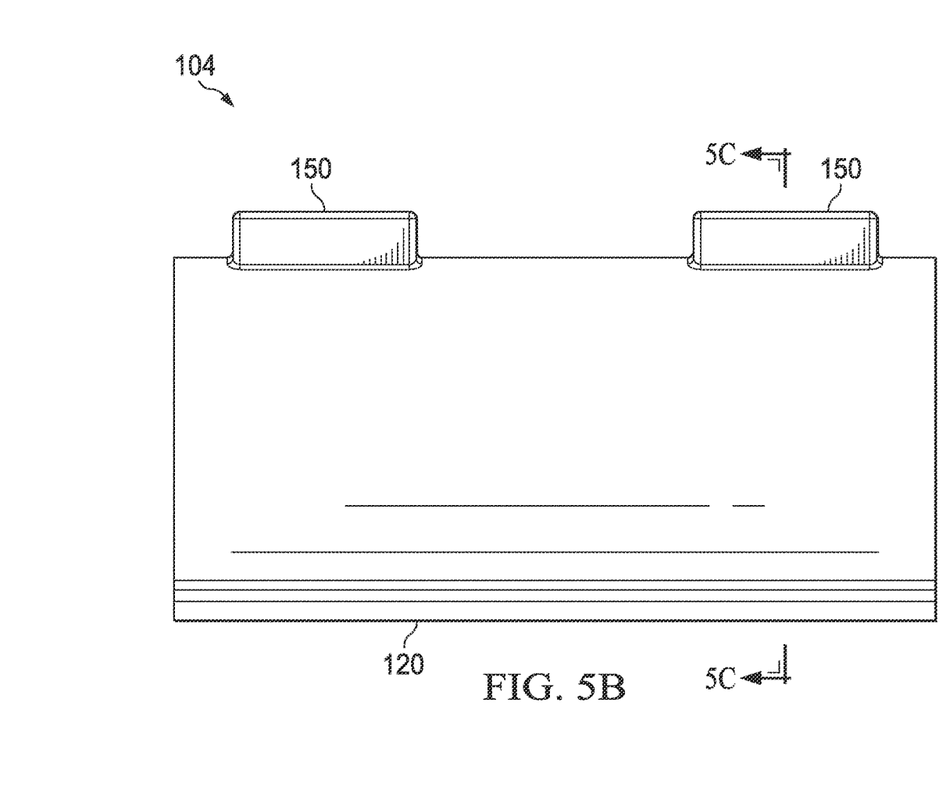
FIG. 5B is a side view of a coupling section of a feeder storage apparatus in accordance with this disclosure.
Figure 5C:
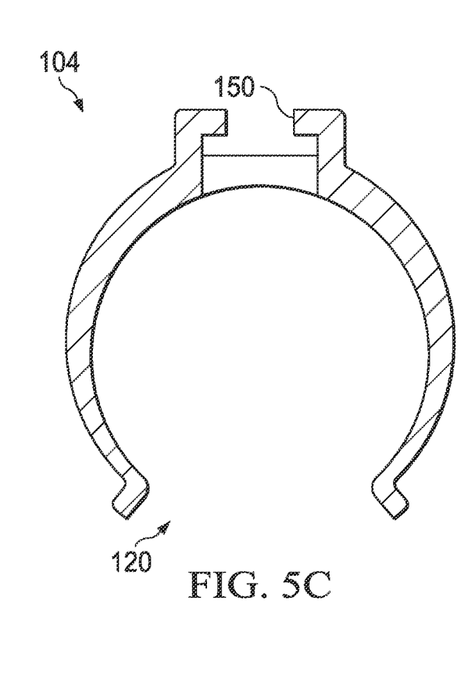
FIG. 5C is a section view taken along line 5C-5C of FIG. 5B.

An embodiment of a coupling member 104 is shown in greater detail in FIGS. 3, 5B and 5C. In some embodiments, the coupling member 104 is cylindrical in shape and includes a transverse opening 120. In some embodiments, the coupling member 104 is made of a flexible material to allow the transverse opening 120 to expand so that the coupling member 104 can be snapped onto the feed tube 106. In other embodiments, the coupling member 104 has other shapes to correspond to the shape of other types of feeding tubes 106.

The body section 108 of the apparatus 100 is shown in greater detail in FIGS. 2 and 5A. The body section 108 of the apparatus 100 is located between the coupling member 104 and the feeder contacting section 110 and is configured to maintain a specified distance between the coupling member 104 and the feeder contacting section 110. In some embodiments, the body section 108 is sized such that when a feeder 102 is placed on the apparatus 100 the feeder 102 does not contact the feed tube 106 and/or an electrical line 160 (see FIG. 1) located above the feed tube 106. For example, in some embodiments the electrical line 160 is located approximately 1.5 inches above the feed tube 106 and the body section 108 is between about 5 inches and about 7 inches in length to allow the feeder 102 to rest on the feeder contacting section 110 without interfering with the electrical line 160.

In some embodiments, the body section 108 includes a first beam member 122, a second beam member 124 and one or more transverse members 126. The transverse members 126 provide structural strength to the body section 108 and extend at non-vertical angles between the first and second beam members 122 and 124. In other embodiments, the body section 108 has other configurations. For example, in some embodiments the body section 108 is a solid, planer piece of material. In other embodiments, the body section 108 includes a first beam member 122 and a second beam member 124 and does not include transverse members 126. In other embodiments, the body section 108 may have any other suitable configuration to maintain a specified distance between the feeder contacting section 110 and the coupling member 104.

With continued reference to FIGS. 2 and 5A, in some embodiments the feeder contacting section 110 includes a first arm 130, a second arm 132 and a convex arm 134. In some embodiments, the first arm 130 and the second arm 132 are angled toward each other so that the first and second arms 130 and 132 fit within an inverted hopper 136 of the feeder 102, as best illustrated in FIGS. 2 and 4.

Referring now specifically to FIGS. 2-4, in some embodiments the convex arm 134 of the feeder contacting section 110 is shaped to fit around at least part of a rib 138 or other internal feature of an inverted hopper 136 of the feeder 102. As illustrated in FIGS. 2 and 4, in some embodiments a first side 140 of the convex arm 134 contacts a first side 144 of the rib 138 and a second side 142 of the convex arm 134 contacts the second side 146 of the rib 138 to hold the feeder 102 on the feeder storage apparatus 100. In other embodiments, the hopper 136 of the feeder 102 has other features that can be placed within the convex arm 134 of the feeder contacting section 110 to hold the feeder 102 on the feeder storage apparatus 100.

Referring now to FIGS. 5A-5C, in some embodiments the body section 108 is removably coupled to the coupling member 104 by way of one or more slots 150 on the coupling member 104. The body section 108 includes a laterally extending shelf 148 at a bottom end 162 of the body section 108 that is configured to mate with one or more slots 150 on the coupling member 104. In some embodiments, the body section 108 couples to the coupling member 104 by slideably engaging the shelf 148 with the slots 150. In the embodiments illustrated in FIG. 5B, the coupling member 104 includes two slots 150 to couple the shelf 148 to the coupling member 104. In yet other embodiments, the body section 108 is coupled to the coupling section 104 using other mechanisms, such as one or more fasteners. In still other embodiments, the body section 108 is integral with the coupling member 104.

Figure 6:
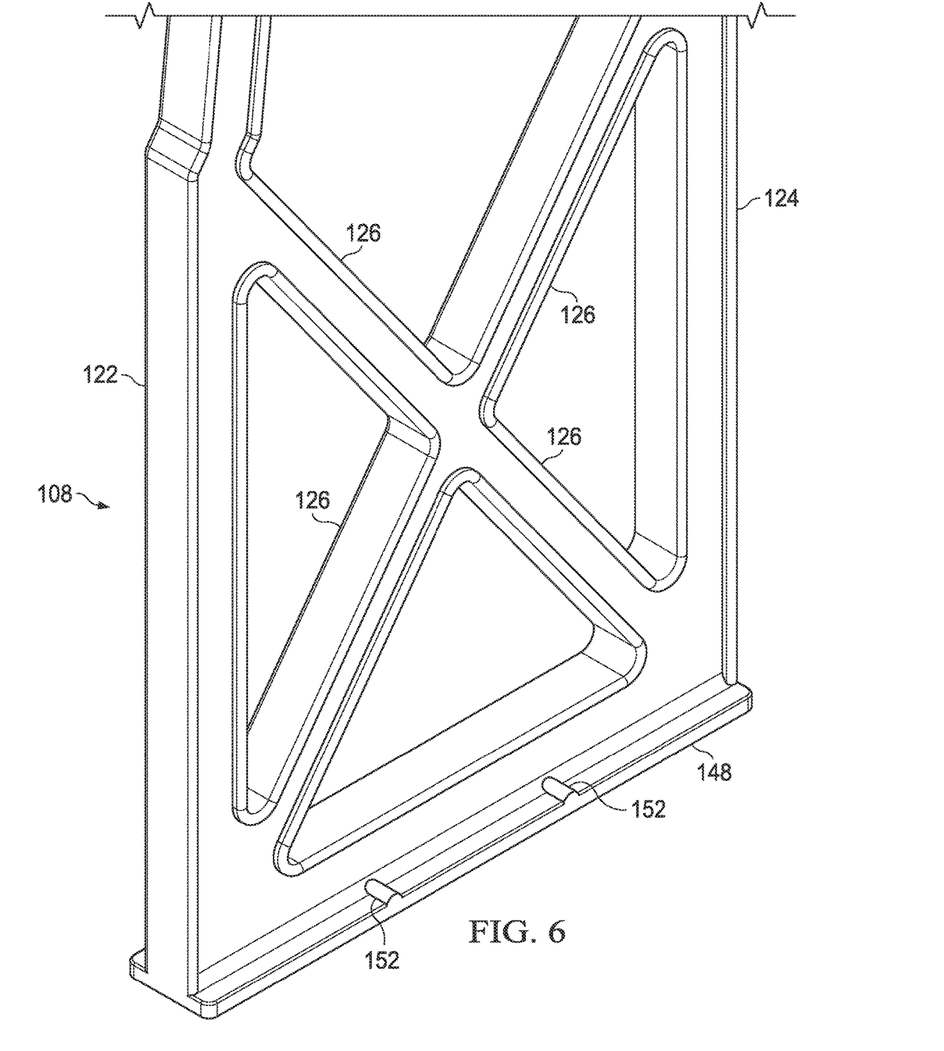
FIG. 6 is a perspective view of a body section of a feeder storage apparatus in accordance with this disclosure.

Referring now to FIG. 6, in some embodiments the lateral extending shelf 148 of the body section 108 include protrusions 152 to removably lock the shelf 148 to the slots 150 (see FIGS. 5B and 5C) so that the coupling member 104 is correctly aligned with respect to the body section 108. In some embodiments, the slots 150 also include corresponding indentations (not shown) to receive the protrusions 152 when the body section 108 is correctly positioned on the coupling member 104.

Figure 7:
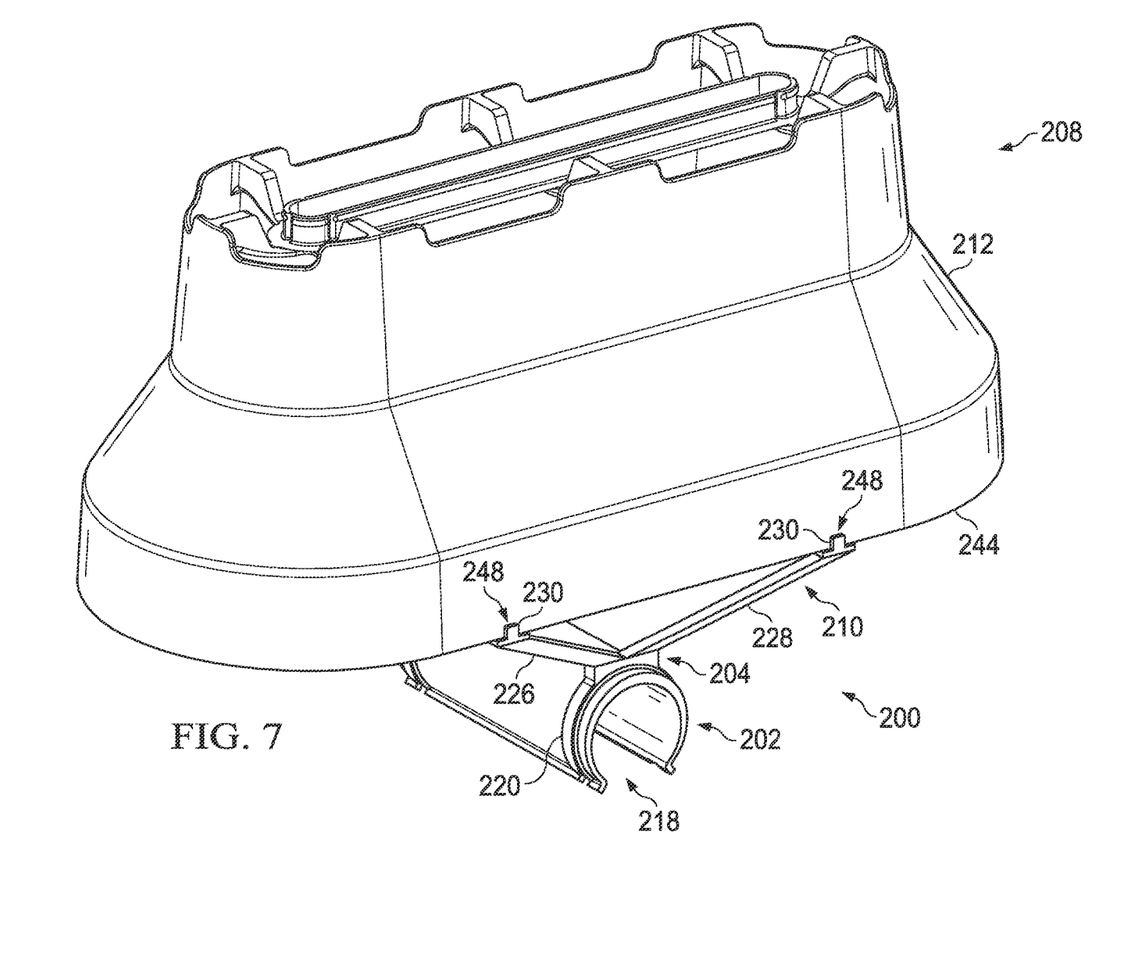
FIG. 7 is a perspective view of another embodiment of a feeder storage apparatus with a feeder resting thereon in accordance with this disclosure.

FIGS. 7-10 illustrate another embodiment of a feeder storage apparatus 200 for storing a feeder 208. Referring specifically to FIG. 7, the feeder storage apparatus 200 includes a coupling member 202 for securing the apparatus 200 to the feed tube 106, a body section 204, and a feeder contacting section 210 for holding a feeder 208 above the feed tube 206 For clarity, the feeder 208 is shown with the tray removed in FIGS. 7 and 10. However, as discussed above, the tray remains attached to the feeder 108 when the feeder 108 is held on the apparatus 200. Thus, the feeder 108 need not be disassembled prior to storage. As will be described in more detail below, the feeder storage apparatus 200 stores the feeder 208 above the feed tube 206 by coupling the feeder contacting section 210 to an edge 244 of the hopper 212.

Figure 8:
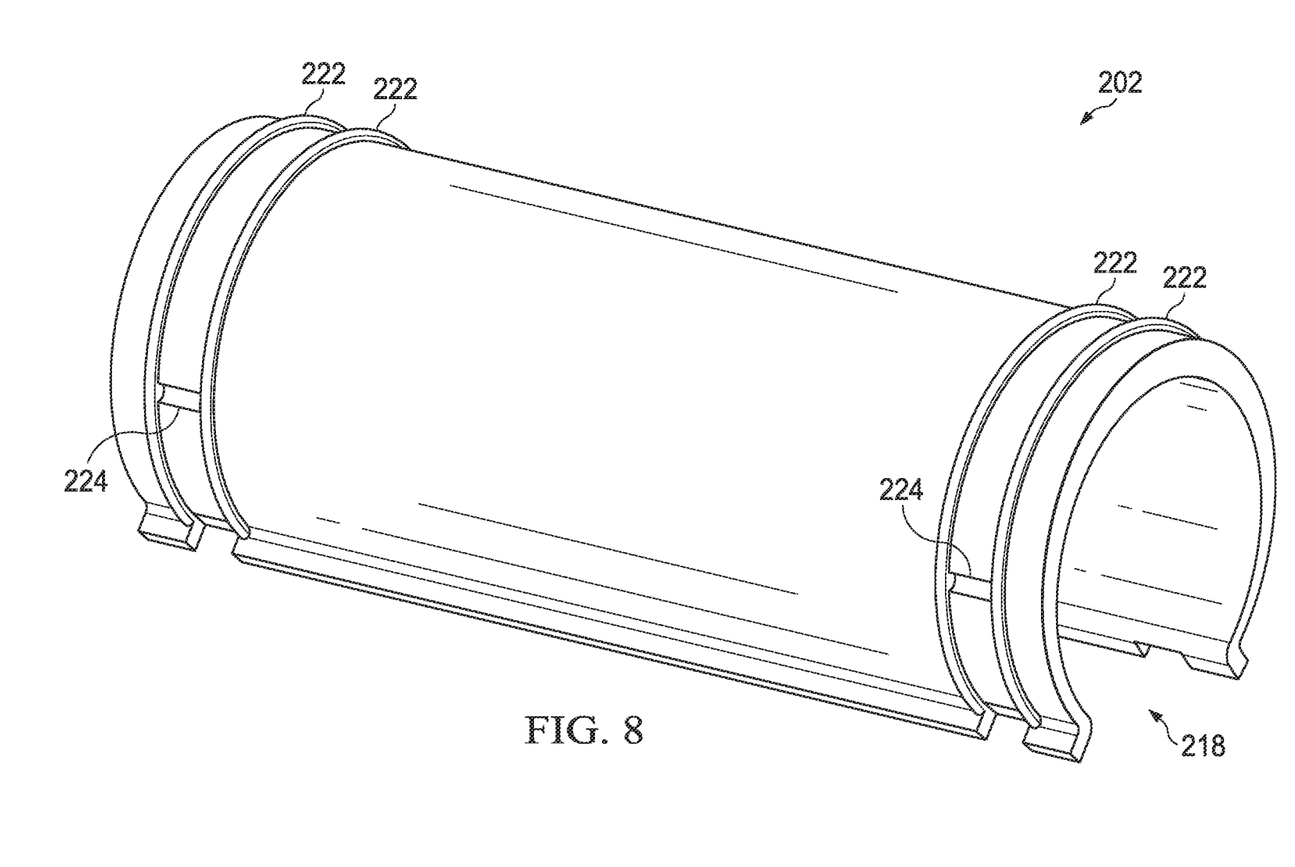
FIG. 8 is a perspective view of a coupling member of a feeder storage apparatus in accordance with this disclosure.

Referring specifically to FIGS. 7 and 8, the coupling member 202 is cylindrical in shape and includes a transverse opening 218 to allow a chicken producer to removably couple the coupling member 202 to the feed tube 106. In some embodiments, the coupling member 202 secures to the feed tube 106 by a friction fit. In other embodiments, the coupling member 202 has other shapes that at least partially encircle the feed tube 106 to secure the apparatus 200 to the feed tube 106. In other embodiments, the coupling member 202 is secured to the feed tube 106 by other mechanisms, such as one or more fasteners (not shown).

Figure 9A:
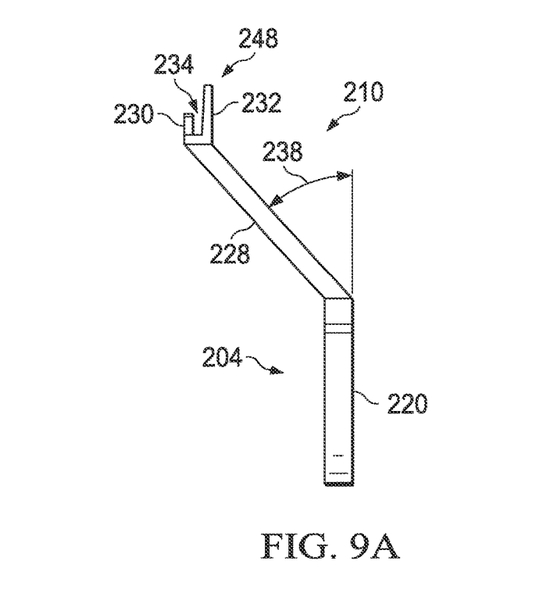
FIG. 9A is a side view of a body section and a feeder contacting section of a feeder storage apparatus in accordance with this disclosure.
Figure 9B:
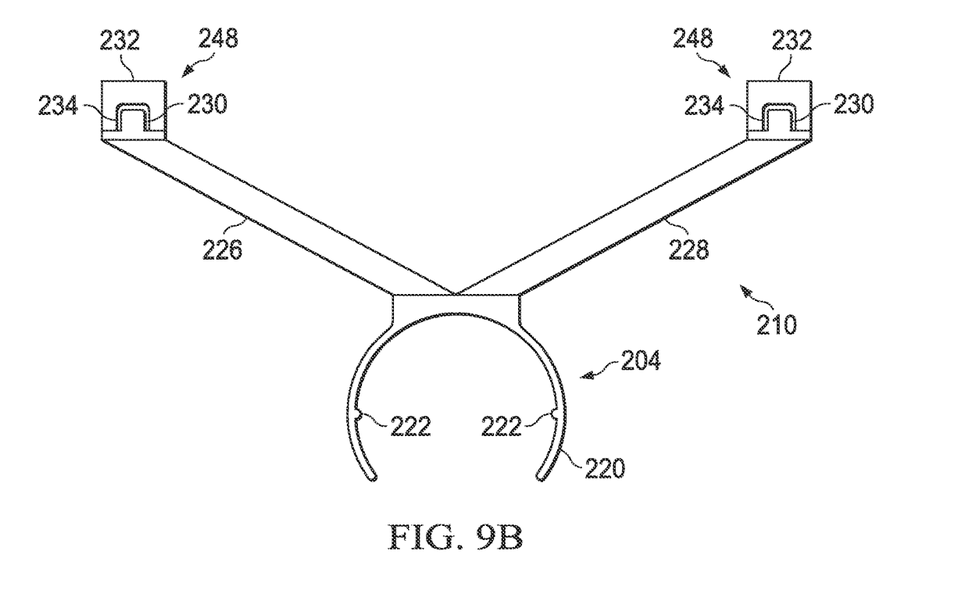
FIG. 9B is a front view of the body section and the feeder contacting section of FIG. 9A.

Referring now to FIGS. 7, 9A and 9B, the body section 204 is located between the feeder contacting section 210 and the coupling member 202 to space the feeder contacting section 210 a predetermined distance from the coupling member 202. In some embodiments, the body section 204 includes a coupling ring 220 that is coupleable to the coupling member 202 by at least partially surrounding the coupling member 202. Referring specifically to FIGS. 8 and 9B, in some embodiments the coupling ring 220 includes protrusions 222 that are configured to mate with indentations 224 (see FIG. 8) in the coupling member 202 to maintain a correct orientation of the coupling ring 220 on the coupling member 202. In some embodiments, the coupling member 202 includes ridges 222 adjacent to the area to which a coupling rings 220 attach. In some embodiments, the ridges 222 maintain and otherwise secure the coupling ring 220 in a desired location on the coupling member 202.

Referring specifically to FIGS. 9A and 9B, in some embodiments the feeder contacting section 210 includes a first arm 226 and a second arm 228 that extended away from the coupling ring 220. In some embodiments, the first and second arms 226 and 228 each include first and second fingers 230 and 232 at a first end 248 of the first and second arms 226 and 228 for coupling a feeder 208 to the arms 226 and 228, as shown in FIG. 7. Referring again to FIGS. 7, 9A and 9B, in some embodiments the first finger 230 is shorter than the second finger 232 to allow a chicken producer to easily align an edge 244 of the hopper 212 with a recess 234 formed between the first and second fingers 230 and 232. For example, in some embodiments the chicken producer places the edge 244 of the hopper 212 against the second finger 232 to guide the hopper 212 downward and into the recess 234 so that the edge moves between the first and second fingers 230 and 232. Referring specifically to FIG. 9A, in some embodiments the first and second arms 226 and 228 extend at an angle 238 from the coupling ring 220. In other embodiments, the first and second arms 226 and 228 extend vertically from the coupling ring 220.

Figure 10:
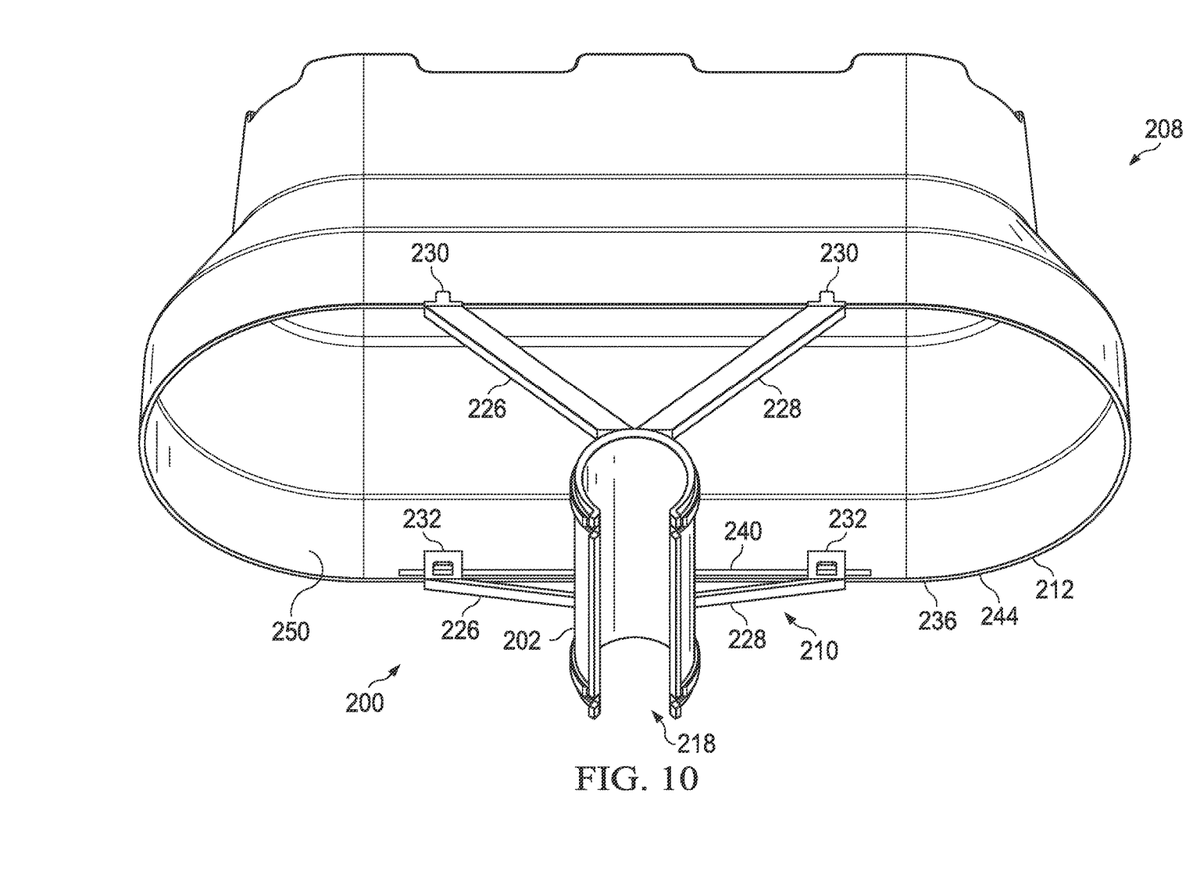
FIG. 10 is a bottom perspective view of an embodiment of a feeder storage apparatus with a feeder resting thereon in accordance with this disclosure.

Referring now to FIG. 10, in some embodiments the hopper 212 of the feeder 208 includes a elongated protrusion 240 on an interior surface 250 of the hopper 212 adjacent to the edge 244. In some embodiments, the second finger 232 of the arms 226 and 228 includes an indentation (not shown) to receive the elongated protrusion 240 to further secure the feeder 208 to the storage apparatus 200.

Figure 11:
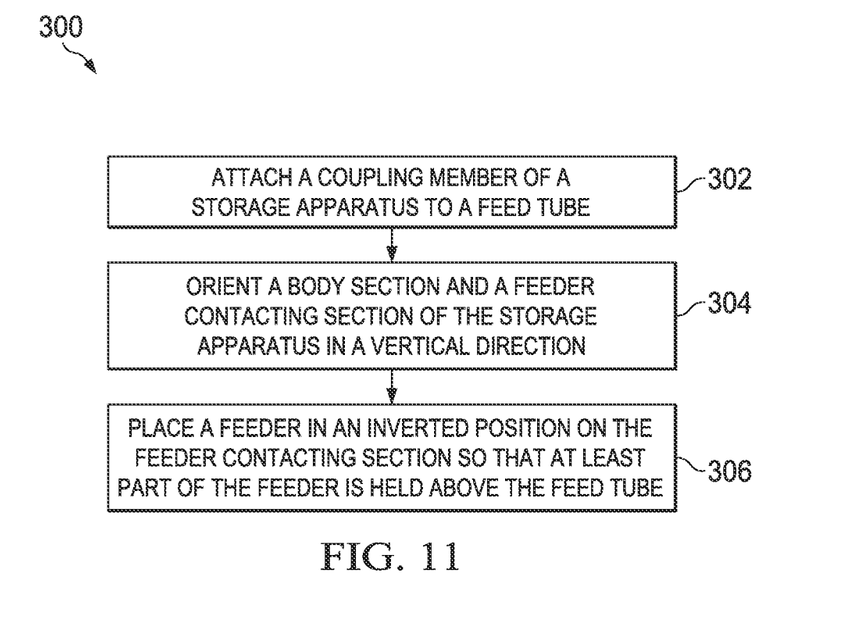
FIG. 11 is a schematic block diagram illustrating an embodiment of a method for storing a chicken feeder in accordance with this disclosure.

FIG. 11 illustrates an embodiment of a method 300 for conveniently storing a chicken feeder on a storage apparatus 100 or 200. In some embodiments, the method 300 begins and the chicken producer removably secures a coupling member 104 or 202 of the storage apparatus 100 or 200 to a feed tube 106, as shown at block 302. The chicken producer attaches the apparatus 100 or 200 so that the body section 100 or 204 and the feeder contacting section 110 or 210 of the storage apparatus 100 or 200 extends vertically from the feed tube 106, as shown at block 304. When the producer is ready to remove a feeder 102 or 208 from the feeding area 114, the producer retrieves the feeder 102 or 208 and places the feeder 102 or 208 in an inverted orientation on the feeder contacting section 110 or 210 of the storage apparatus 100 or 200, as shown at block 306. In some embodiments, at least a portion of the feeder 102 or 208 is held above the feed tube 106 by the apparatus 100 or 200. In some embodiments, such as the embodiments illustrated in FIGS. 1-6, the chicken producer places the feeder 102 on the apparatus 100 such that a convex arm 134 of the feeder contacting section 110 contacts a rib 138 of the hopper 136 of the feeder 102 to hold the feeder 102 on the apparatus 100. In other embodiments, such as the embodiment illustrated in FIGS. 7-10, the chicken producer places an edge 244 of the hopper 212 within a recess 234 of the arms 226 and 228 of the apparatus 200 between a first finger 230 and a second finger 232. When the chicken producer desires to return the feeder 102 or 208 to its position on the feeding area 114, the producer simply removes the feeder 102 or 208 from the feeder contacting section 110 or 210 and places the feeder 102 or 208 below a feeder outlet 118 adjacent to the feeder storage apparatus 100 or 200.

The foregoing describes only some embodiments of the invention(s), and alterations, modifications, additions and/or changes can be made thereto without departing from the scope and spirit of the disclosed embodiments, the embodiments being illustrative and not restrictive. In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A storage apparatus for storing a chicken feeder on a feed tube, comprising:
   a body section;
   a coupling member on a first end of the body section for securing the body section to the feed tube; and
   a feeder contacting section on a second end of the body section, wherein the feeder contacting section includes at least one arm to support a feeder above the feed tube, wherein the at least one arm includes a pair of arms, the arms angled towards each other and wherein the feeder contacting portion includes a convex arm extending between the pair of arms.

2. The feeder storage apparatus of claim 1, wherein the body section is removably attachable to the coupling member.

3. The feeder storage apparatus of claim 2, wherein the body section is slideably attachable to the coupling member.

4. The feeder storage apparatus of claim 1, wherein the body section includes a pair of support beams and one or more transverse beams extending between the support beams.

5. The feeder storage apparatus of claim 1, wherein the pair of arms are angled away from each other and the arms each include one or more fingers at a distal end of the arms.

6. The feeder storage apparatus of claim 1, wherein the coupling member couples to the feed tube by a friction fit.

7. A feeder system, comprising:
   a feeder;
   a storage apparatus, the storage apparatus comprising:
      a body section;
      a coupling member on a first end of the body section, the coupling member being cylindrical and including a transverse opening along its length for securing the body section to a feed line; and
      a feeder contacting section extending from a second end of the body section, wherein the feeder contacting section supports the feeder so that at least a portion of the feeder is supported above the feed line.

8. The feeder storage system of claim 7, wherein the feeder contacting section includes arms for supporting the feeder.

9. The feeder storage system of claim 8, further comprising a concave arm extending between the arms to support the feeder.

10. The feeder storage system of claim 8, wherein the arms include a first finger, a second finger and a recess located between the first and second fingers for receiving an edge of the hopper.

11. The feeder storage system of claim 9, wherein the body section is removably coupled to the coupling member.

12. A method for storing a chicken feeder, comprising:
   attaching a coupling member of a storage apparatus to a feed tube so that a body section and a feeder contacting section of the storage apparatus extend upwardly from the feed tube;
   placing the feeder in an inverted position on the feeder contacting section of the storage apparatus so that at least part of the feeder is supported above the feed tube, wherein attaching the coupling member to the feed tube comprises expanding a transverse opening of the coupling member around the feed tube.

13. The method of storing the feeder of claim 12, wherein placing the feeder on the feeder contacting section of the storage apparatus comprises locating a rib of the feeder in a concave arm of the feeder contacting section.

14. The method of storing a feeder of claim 12, wherein placing the feeder on the feeder contacting section of the storage apparatus comprises supporting an edge of a hopper on first and second fingers of the feeder contacting section.

15. The method of storing the feeder of claim 14, further comprising placing a protrusion of the hopper within an indentation of the first finger.

16. The method of storing the feeder of claim 12, further comprising coupling the body section to the coupling member by slideably engaging the body section with the coupling member.

17. A storage apparatus for storing a chicken feeder on a feed tube, comprising:
   a body section;
   a coupling member on a first end of the body section for securing the body section to the feed tube; and
   at least one arm extending from the body section and a convex arm secured to and extending from the at least one arm to support the chicken feeder on the feed tube.

* * * * *